(12) United States Patent
Jenkins et al.

(10) Patent No.: US 8,798,432 B2
(45) Date of Patent: Aug. 5, 2014

(54) FABRICATION OF A LAMINATED OPTICAL WEDGE

(75) Inventors: Kurt Allen Jenkins, Sammamish, WA (US); Timothy Large, Bellevue, WA (US); Rajesh Manohar Dighde, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 543 days.

(21) Appl. No.: 12/909,684

(22) Filed: Oct. 21, 2010

(65) Prior Publication Data
US 2012/0099828 A1 Apr. 26, 2012

(51) Int. Cl.
*G02B 6/10* (2006.01)

(52) U.S. Cl.
USPC .......................................... 385/146

(58) Field of Classification Search
USPC .......................................... 385/146
See application file for complete search history.

(56) References Cited

U.S. PATENT DOCUMENTS

| | | | |
|---|---|---|---|
| 5,319,007 A * | 6/1994 | Bright | 523/516 |
| 6,124,906 A | 9/2000 | Kawada et al. | |
| 6,440,334 B2 * | 8/2002 | Currens et al. | 264/1.34 |
| 6,799,860 B2 | 10/2004 | Nakaoka et al. | |
| 6,895,164 B2 | 5/2005 | Saccomanno | |
| 7,607,814 B2 | 10/2009 | Destain | |
| 7,654,722 B2 | 2/2010 | Chen et al. | |
| 2004/0062513 A1 | 4/2004 | Sung et al. | |
| 2004/0069959 A1 | 4/2004 | Akiyama et al. | |
| 2004/0089959 A1 | 5/2004 | Lee et al. | |
| 2004/0141306 A1 | 7/2004 | Chen et al. | |
| 2008/0136050 A1 | 6/2008 | Seo et al. | |
| 2008/0271776 A1 | 11/2008 | Morgan | |
| 2010/0177380 A1* | 7/2010 | Nagahama et al. | 359/359 |

FOREIGN PATENT DOCUMENTS

| | | |
|---|---|---|
| CN | 1595443 A | 3/2005 |
| JP | 2002292687 A | 10/2002 |
| TW | 448315 B | 8/2001 |
| TW | 200410807 | 7/2004 |

OTHER PUBLICATIONS

"International Search Report", Mailed Date: Apr. 23, 2012, Application No. PCT/US2011/054507, Filed Date: Oct. 8, 2011, pp. 8.
Argyros, et al., "Hollow-core microstructured polymer optical fiber", Retrieved at << http://adl.serveftp.org/heybryan/papers/Hollow-core%20microstructured%20polymer%20optical%20fiber.pdf >>, Optics Letters, vol. 31, No. 2, Jan. 15, 2006, pp. 172-174.

\* cited by examiner

*Primary Examiner* — Uyen Chau N Le
*Assistant Examiner* — Hoang Tran
(74) *Attorney, Agent, or Firm* — Jeremy Snodgrass; Glen Johnson; Micky Minhas

(57) ABSTRACT

Embodiments are disclosed that relate to fabrication of a laminated optical wedge. One embodiment provides a method comprising inserting a wedge blank into a vacuum molding tool, applying a vacuum to the vacuum molding tool, and removing a layer from a top surface of the wedge blank to expose a machined surface of the wedge blank. The method further comprises laminating a finish piece to the machined surface via an adhesive, wherein the finish piece comprises a smoother surface than the machined surface, and curing the adhesive to form a finished optical wedge. The method further comprises removing the finished optical wedge from the vacuum molding tool.

16 Claims, 7 Drawing Sheets

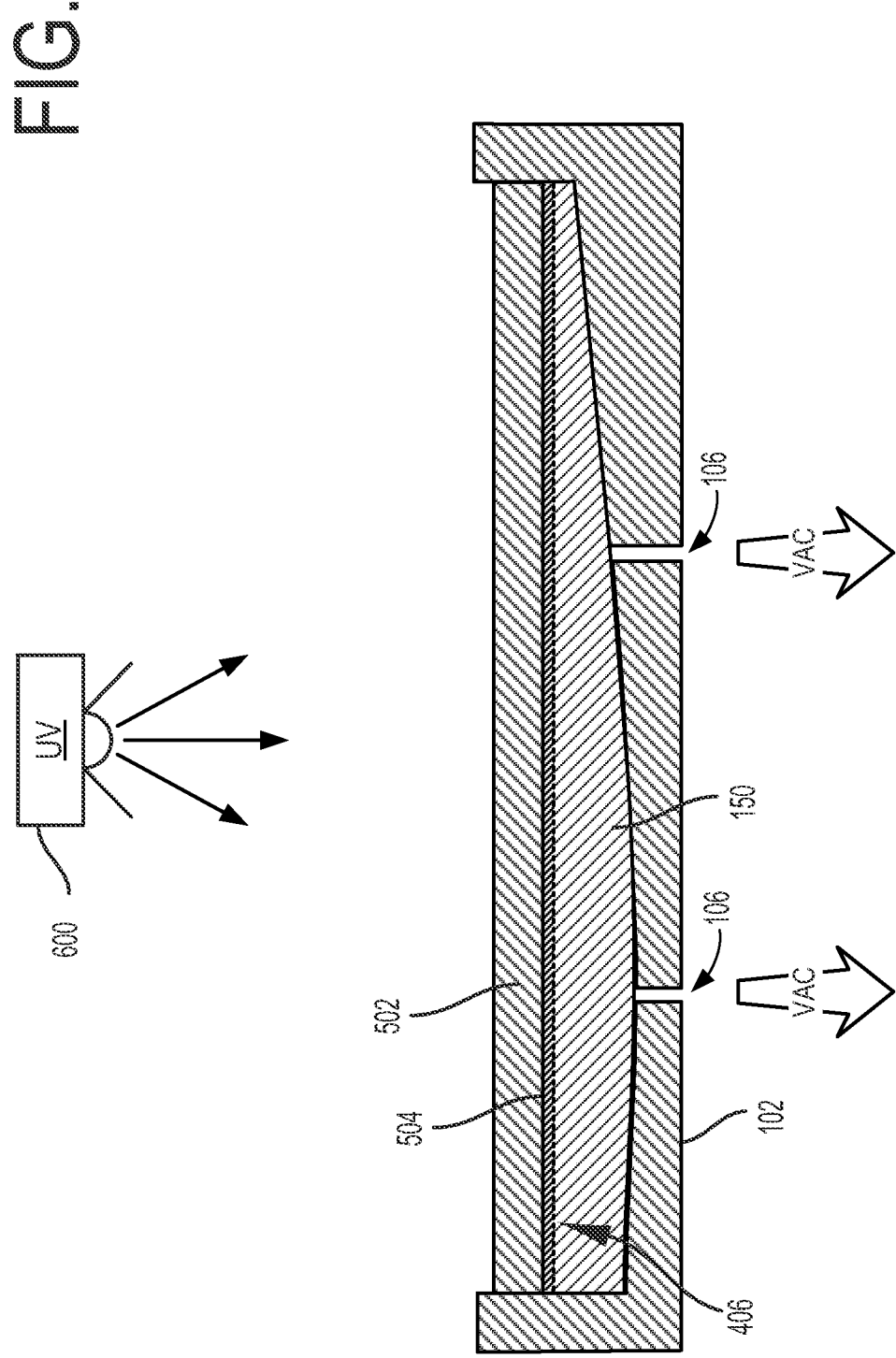

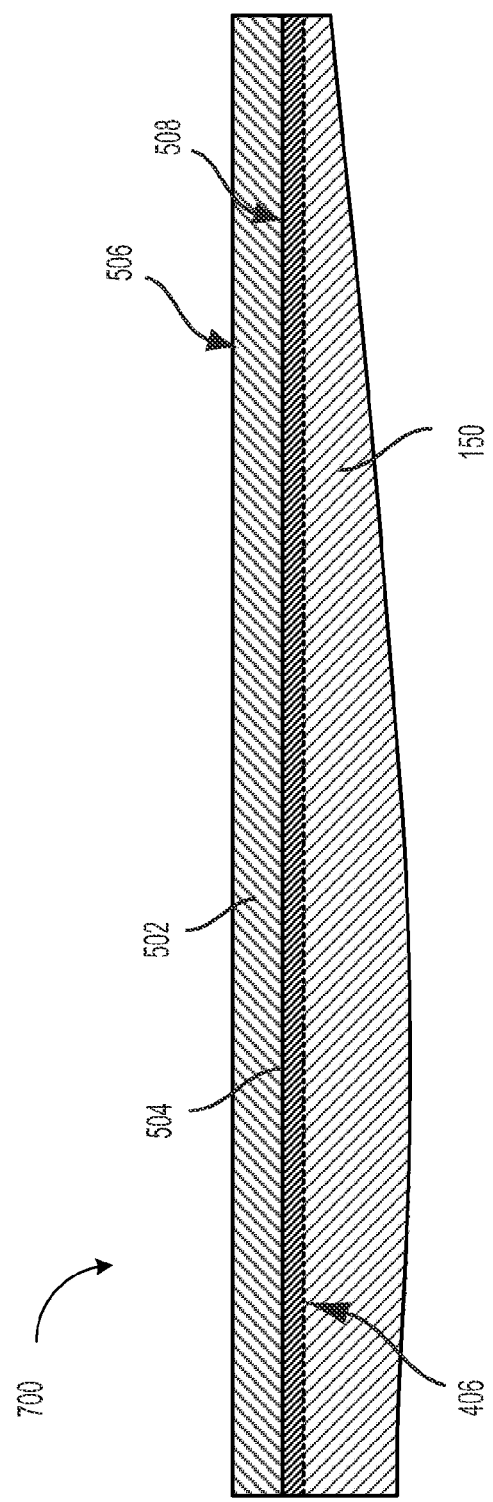

FABRICATION OF A LAMINATED OPTICAL WEDGE

BACKGROUND

An optical wedge is a wedge-shaped light guide configured to transmit light between a first light interface located at an end of the light guide and a second light interface located at a major face of the light guide via total internal reflection. Light input into the first light interface within a suitable range of input angles propagates through the optical wedge until the critical angle of internal reflection is reached, thereby allowing the light to be transmitted out of the optical wedge through the second interface. Depending upon the design of a particular optical wedge, the first light interface may be either at a thin end or a thick end of the optical wedge. In either case, the internal reflection of light within the optical wedge allows light to fan out to a desired beam size within a relatively small volume of space, and therefore may permit the construction of a relatively compact optical system compared to a similar system without an optical wedge.

Surface roughness may negatively impact the performance of an optical wedge, as such roughness may result in light leakage and may impact image quality. A surface roughness of 2 nm RA (Roughness Average, defined as an arithmetic average of an absolute deviation from a mean surface level) or less may be desirable in some applications to avoid such problems. Further, poor dimensional accuracy of an optical wedge can lead to shearing, splitting, or ghosting of an image.

SUMMARY

Various embodiments are disclosed herein that relate to fabrication of a laminated optical wedge. For example, one disclosed embodiment provides a method comprises inserting a wedge blank into a vacuum molding tool, applying a vacuum to the vacuum molding tool, and removing a layer from a top surface of the wedge blank to expose a machined surface of the wedge blank. The method further comprises laminating a finish piece to the machined surface via an adhesive, wherein the finish piece comprises smoother surface than the machined surface, and curing the adhesive to form a finished optical wedge. The method further comprises removing the finished optical wedge from the vacuum molding tool.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a schematic cross-sectional view of an embodiment of FIG. 1 showing an embodiment of curing an adhesive within a lamination process.

FIG. 7 is a schematic cross-sectional view of a finished optical wedge in accordance with an embodiment of the present disclosure.

DETAILED DESCRIPTION

As described above, surface smoothness and dimensional accuracy may be goals in the fabrication of an optical wedge. In some applications, a thickness tolerance of approximately 1% of the maximum thickness of the wedge may be desired to avoid loss of light from the wrong surface of the wedge. Further, surface ripples having a period approaching a magnitude of a projected light beam diameter may cause degradation in image focus, which may be magnified over the course of multiple reflections from the rippled surface. It may be desirable in some embodiments to achieve a target level of surface ripple of 1 micron/20 mm, as a nonlimiting example. Further, in some embodiments, it may be desirable to achieve surface smoothness of 2 nm RA to avoid scattering light and loss of image contrast.

However, manufacturing an optical wedge with such properties may pose various challenges. For example, a PMMA (poly(methyl methacrylate)) extruded optical wedge may have surface roughness on the order of 10 nm RA arising from the extrusion aperture, which is well above the <2 nm RA that may be desired for some applications. An optical wedge cast between two float glass sheets may have acceptable smoothness. However, PMMA may shrink by approximately 12-24% during curing. Due to the non-uniform thickness of an optical wedge, this shrinkage may result in poor thickness profile tolerance, leading to loss of functionality.

Accordingly, various embodiments are provided herein that relate to manufacturing an optical wedge in a manner that may help to avoid such issues. It will be appreciated that the schematic views presented herein are greatly exaggerated for illustrative purposes.

Figure 1:
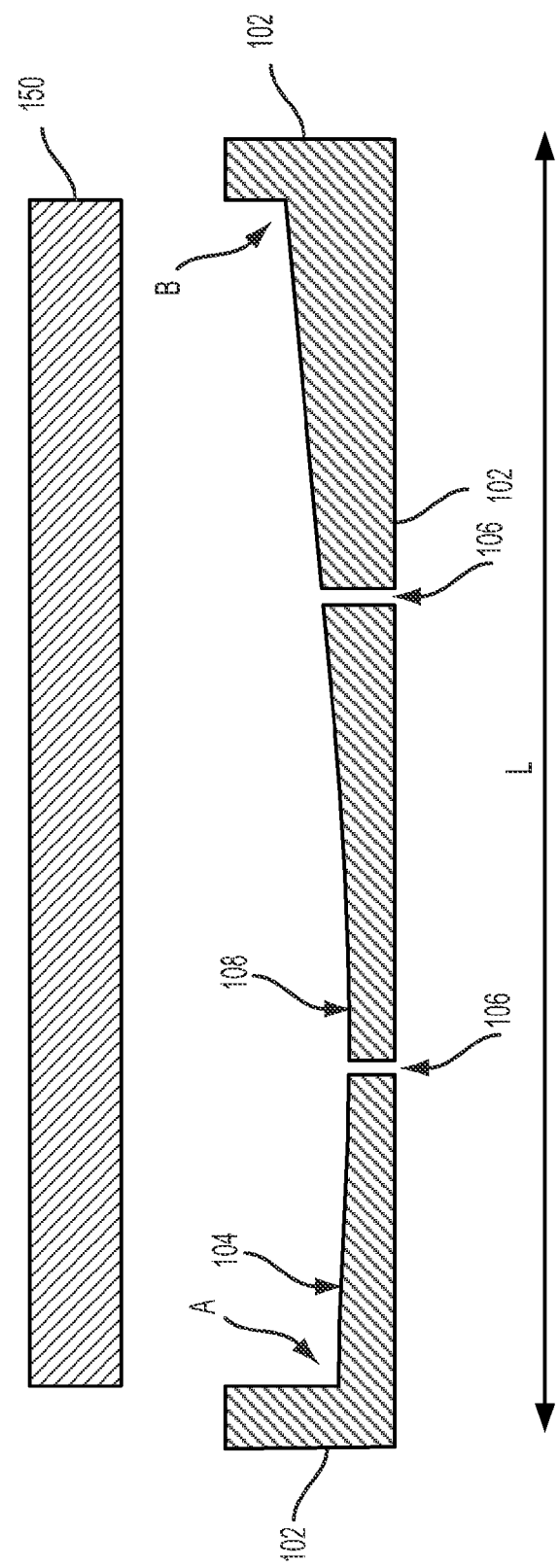
FIG. 1 is a schematic cross-sectional view of embodiments of a vacuum molding tool and of a wedge blank positioned over the vacuum molding tool.

FIG. 1 is a schematic view of an embodiment of a vacuum molding tool 102 for molding an optical wedge from a wedge blank 150, wherein wedge blank 150 is a starting material for molding an optical wedge. Wedge blank 150 may be made from any suitable optical material, including but not limited to an optical-grade material, such as acrylic PMMA, polycarbonate, polystyrene, etc. For example, in some embodiments, wedge blank 150 may be a cast acrylic sheet formed by curing a monomer poured between two float glass forms separated by a gasket. The resulting cast sheet may exhibit approximately similar average surface roughness values as those of the float glass forms, which in some embodiments may be 2 nm RA or less. Thus, the surface of wedge blank 150 opposite the surface to be machined may have an average surface roughness of approximately 2 nm RA or less, and in some embodiments, 1 nm RA or less. It will be understood that this method of forming a wedge blank is described for the purpose of example, and that a wedge blank may be formed in any other suitable manner.

Wedge blank 150 may have any suitable dimensions. For example, in some embodiments, wedge blank 150 may have a pre-processing thickness of approximately 1 mm-20 mm. Because some acrylic polymerization processes result in approximately 12%-24% shrinkage of the acrylic material as the polymerization reactions progress, it will be appreciated that a thicker initial charge of monomer may be used in some embodiments to achieve such a final thickness for the wedge blank 150.

Vacuum molding tool 102 includes one or more vacuum ports 106 fluidly connected to a vacuum pump (not shown) and configured to channel air and/or other gases from the vacuum molding tool 102 toward the vacuum pump. In some embodiments, vacuum molding tool 102 may be mounted on a stabilized surface, such as an optical mount platform, to provide a level surface for the molding and casting operations described in more detail.

Vacuum molding tool 102 also includes a vacuum forming surface 104 configured to provide a form to shape a surface of the optical wedge into a desired profile. For example, in FIG. 1, vacuum forming surface 104 exhibits an optical surface profile that changes in thickness along a direction L running from end A of vacuum molding tool 102 to an opposite end B. Ends A and B correspond respectively to thick and thin edges of the resulting optical wedge. Thus, the optical wedge fabricated in the vacuum molding tool 102 of FIG. 1 will exhibit an optical surface profile matching the optical surface profile of vacuum forming surface 104. It will be appreciated that the optical surface profile of vacuum forming surface 104 may have any suitable profile along its length and width of vacuum forming surface 104 to achieve optical and/or structural characteristics for a particular end-use application.

In some embodiments, vacuum forming surface 104 may include one or more local topographic characteristics 108 configured to impart corresponding topographic features to the finished optical wedge. For example, in the scenario shown in FIG. 1, local topographic characteristic 108 is shown as a thickness maximum configured to impart an aspherical optical feature to the finished optical wedge. It will be appreciated that vacuum forming surface 104 ma be formed by any suitable process, such as by cutting with a ball-end milling cutter. It will also be understood that a molding surface may include any other suitable shape, including but not limited to flat.

Figure 2:
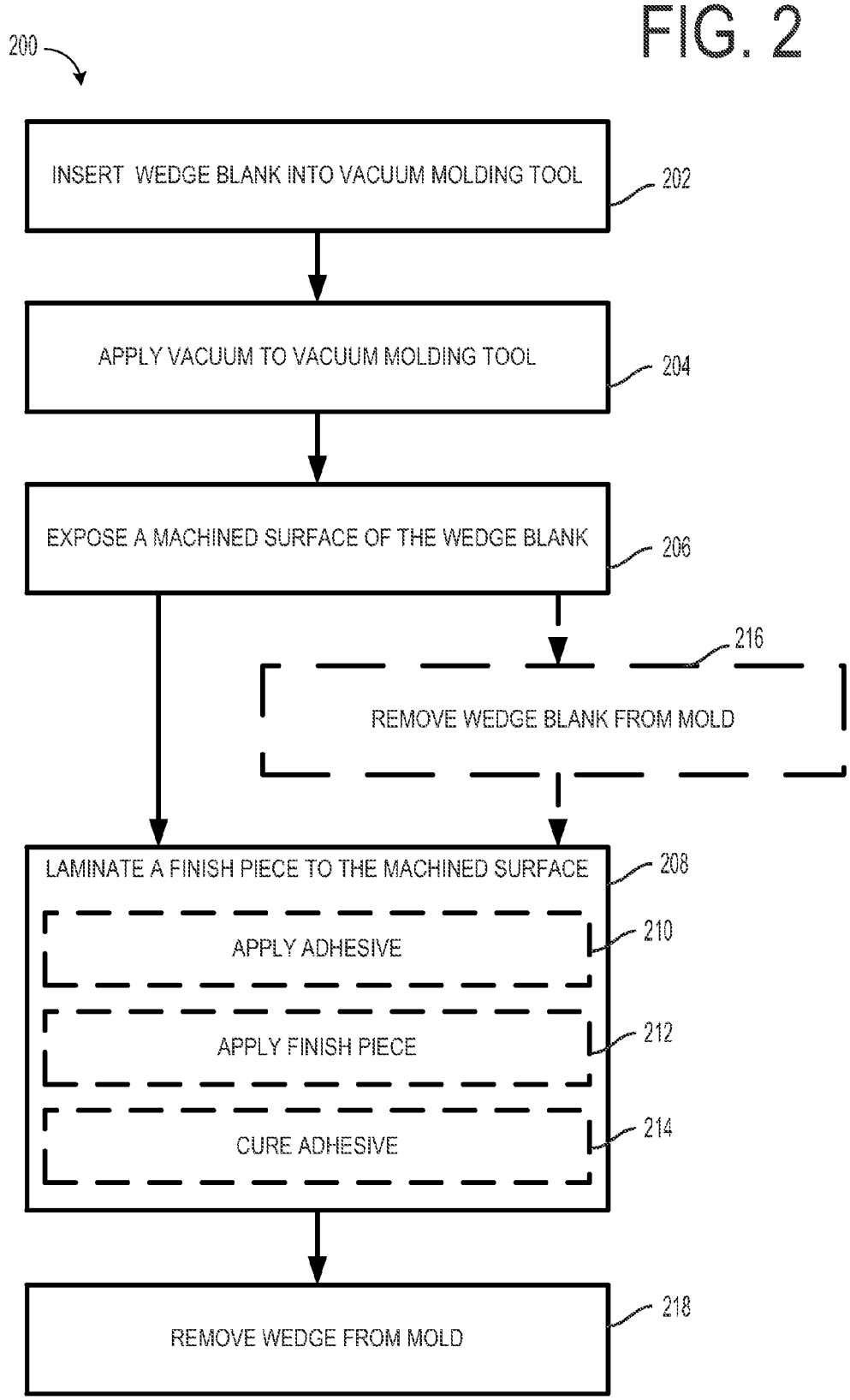
FIG. 2 is a flowchart depicting an embodiment of a method of fabricating an optical wedge.

FIG. 2 shows a flowchart showing an embodiment of a method 200 for fabricating an optical wedge. It will be appreciated that one or more processes within method 200 may be performed by any suitable vacuum molding tool for fabrication of an optical wedge, and is not limited to the embodiments described herein.

Figure 3:
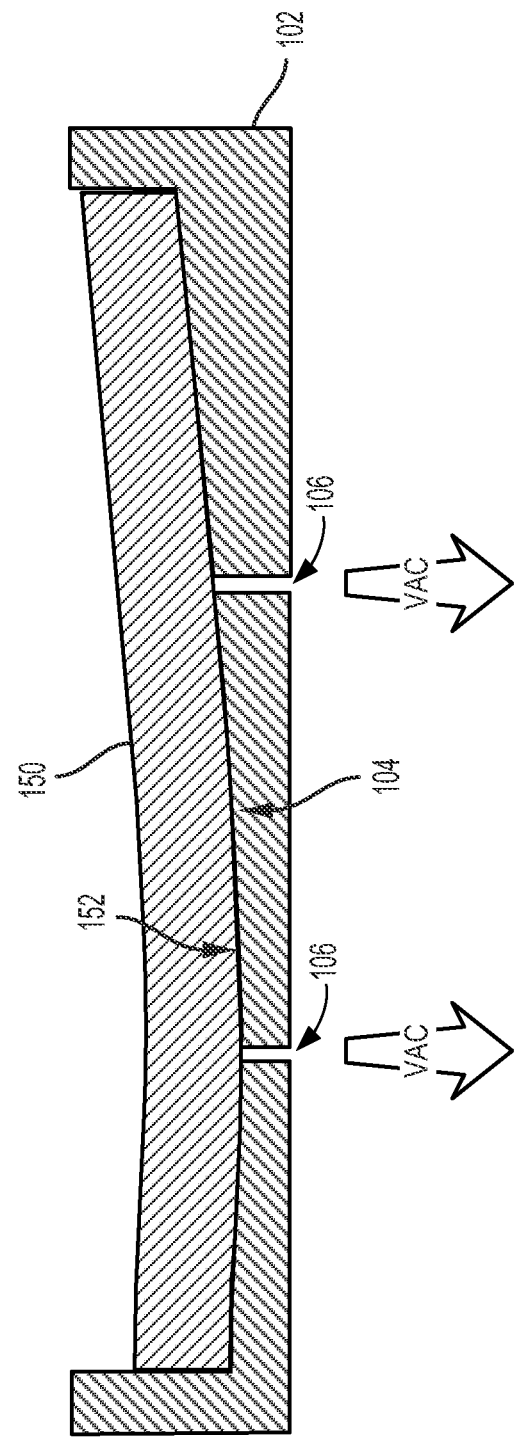
FIG. 3 is a schematic cross-sectional view of the embodiment of FIG. 1 showing a wedge blank inserted into the vacuum molding tool.

Method 200 comprises, at 202, inserting a wedge blank into a vacuum molding tool. To illustrate this, FIG. 3 shows a cross-sectional view of an embodiment of a wedge blank 150 inserted into vacuum molding tool 102. Method 200 next comprises, at 204, applying a vacuum to the molding tool. In the example shown in FIG. 3, a vacuum has been applied to vacuum molding tool 102 via vacuum ports 106. Application of the vacuum causes wedge blank 150 to be pressed against vacuum forming surface 104, so that the optical surface profile of vacuum forming surface 104 is imparted to molded surface 152 of wedge blank 150. Thus, in a scenario where a cast acrylic blank is inserted into wedge molding tool 102, the cast acrylic molding surface may retain the surface smoothness native to the cast acrylic blank during machining of the opposite surface.

Figure 4:
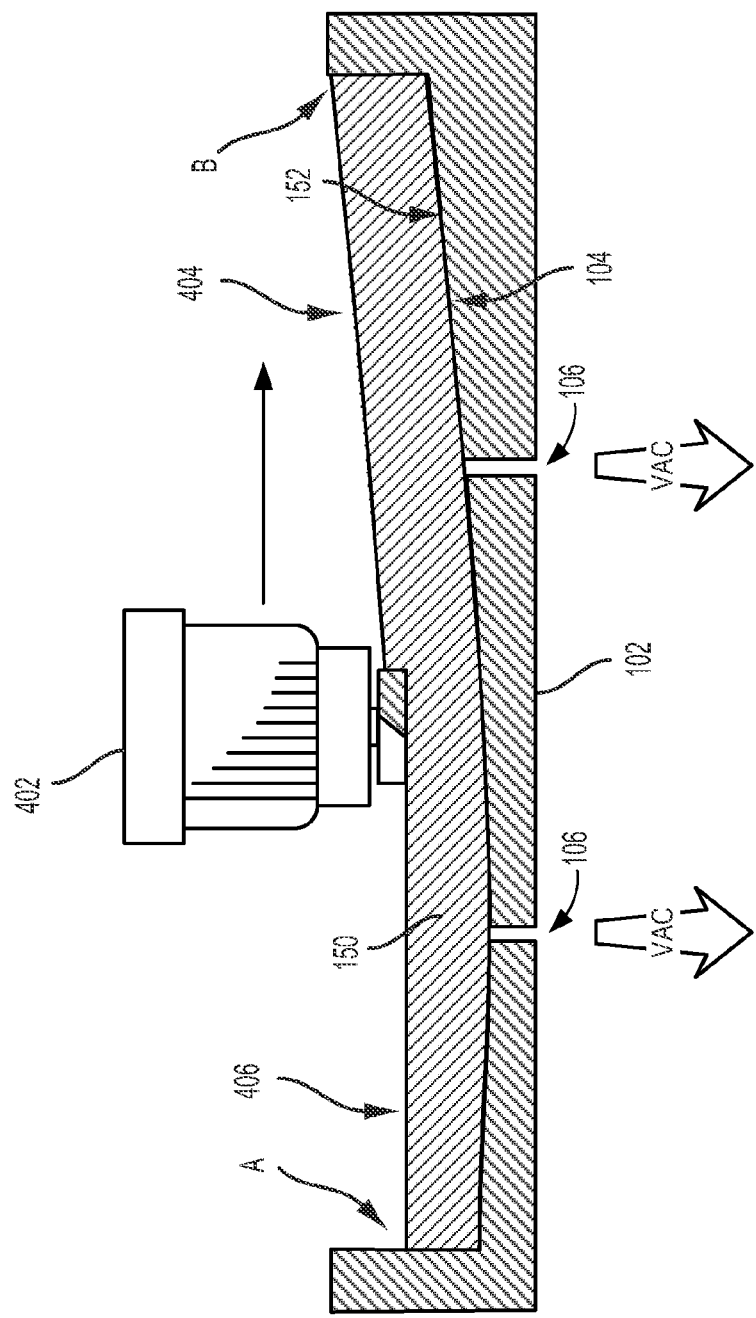
FIG. 4 is a schematic cross-sectional view of an embodiment of FIG. 1 showing a machined surface of the wedge blank being exposed.

Continuing, method 200 comprises, at 206, removing a portion of the top surface of the wedge blank while the vacuum molding tool is still under vacuum. For example, FIG. 4 shows a cross-sectional view of wedge blank 150 inserted into vacuum molding tool 102. Top surface 404 of wedge blank 150 is being machined by milling machine 402 to produce machined surface 406. It will be appreciated that any suitable machining process may be employed to form machined surface 406. For example, while FIG. 4 depicts a single bit, a CNC milling machine equipped with a wide, multi-head cutter may be used to produce machined surface 406 in a more efficient manner than a single bit. As a result of the machining process, the A end of the wedge blank is thicker than the B end. In some embodiments, as much as 50 percent of the wedge blank may be removed by machining, while in other embodiments either more or less material may be removed.

The machined surface of the wedge blank may have a surface roughness of less than 100 nm RA. However, as mentioned above, in some applications a surface having a roughness of 2 nm RA or less may be desired. Thus, method 200 comprises, at 208, laminating a finish piece to the machined surface via an adhesive, wherein the finish piece comprises a surface of a desired optical smoothness that is smoother than the machined surface. Laminating the finish piece to the wedge blank may comprise various sub-steps. For example, in the embodiment of FIG. 2, an adhesive is applied at 210 to the machined surface and/or the finish piece, the finish piece is applied at 212 onto the wedge blank, and the adhesive is cured at 214 to bond the finish piece to the wedge blank. The use of an optically-matched adhesive to laminate the finish piece onto the wedge blank helps to prevent reflections at the boundary between the machined surface and the finish piece, thereby producing an optical wedge with desired internal reflection characteristics.

Figure 5:
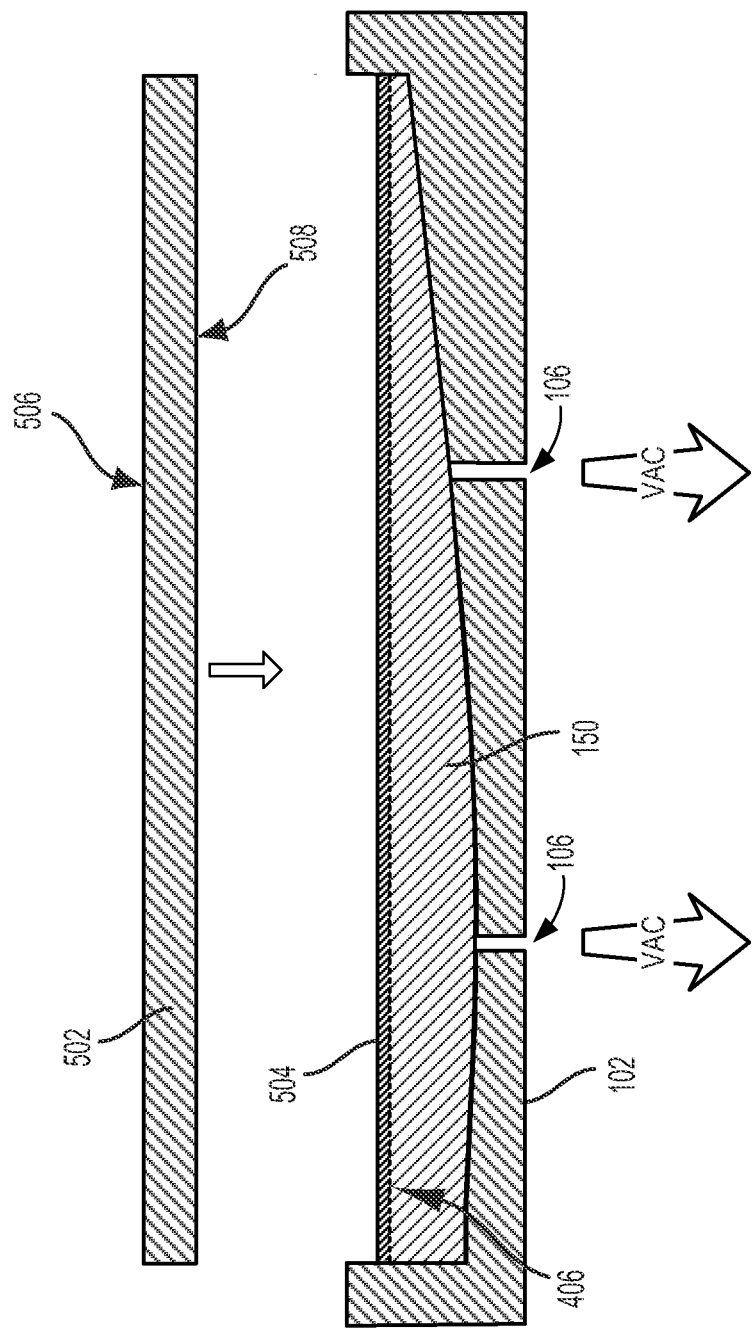
FIG. 5 is a schematic cross-sectional view of an embodiment of FIG. 1 showing a finish layer being laminated on top of the machined surface of the wedge blank.

FIG. 5, which illustrates a lamination process, shows a cross-sectional view of machined surface 406 of wedge blank 150, onto which an adhesive 504 has been applied. FIG. 5 also illustrates a finish piece 502 to be placed onto the adhesive. As mentioned above, the finish piece comprises a surface 506 opposite of a face 508 proximate to the adhesive 504 that is smoother than the machined surface. It will be understood that the adhesive may also be applied to the finish piece, or to both the finish piece and wedge blank in various embodiments.

In FIG. 5, the finish piece is illustrated as being applied to the machined surface of the wedge blank while the wedge blank is held to the vacuum molding tool under vacuum. In other embodiments, the lamination process may be performed after removal of the vacuum that holds the wedge blank in place. Accordingly, in such embodiments, method 200 may optionally include, at 216, removing the wedge blank from the vacuum molding tool prior to performing the lamination.

Any suitable adhesive may be used to laminate the finish piece to the wedge blank. Suitable adhesives include those with a sufficiently close index of refraction to the wedge blank and finish piece material(s), and/or suitable viscosity and wetting characteristics to fill gaps in the machined surface, such that the interface formed between the finish piece and the machined surface does not cause an undesirable amount of internal reflection and/or light scattering. In some embodiments, the adhesive may have an index of refraction within +/−0.02 of that of the wedge and finish piece material(s), and within +/−0.01 in other embodiments. Further, the adhesive may be selected to be optically transparent within a desired wavelength range. As examples, the adhesive may be visibly transparent where the optical wedge is to be used for visible light projection, and/or transparent to infrared wavelengths for collecting and transmitting infrared light in a machine vision system.

The adhesive 504 may have any suitable physical properties. For example, the adhesive may be liquid, pressure-sensitive, meltable, etc. Further, the adhesive 504 may comprise any suitable material or materials. As a nonlimiting example, the adhesive may be a PMMA adhesive where the wedge blank 150 and/or finish piece 506 comprise PMMA. It will be understood that the type of adhesive utilized at 210 may affect the selection of a suitable curing process, as described in more detail with reference to 214.

The adhesive may be applied in any suitable manner. For example, a wet adhesive may be applied in a roll-to-roll process, while a pressure-sensitive adhesive may be applied by printing the adhesive onto the machined surface.

In yet other embodiments, a hot-melt ultraviolet (UV) curable adhesive may be used. Such an adhesive has a melting temperature above room temperature, and is UV curable. To use such an adhesive, a thin layer of adhesive dissolved in a solvent is applied by printing, and then the finish piece is placed on the adhesive. Next, the adhesive is melted, allowing it to flow to fill gaps and expel bubbles. After melting, the adhesive is cured by illuminating the adhesive with UV light.

The wedge blank 150 and finish piece 502 may be formed from any suitable material or materials. As mentioned above, matching the indices of refraction of the wedge blank 150, finish piece 502, and adhesive 504 may help to reduce undesired reflections and scattering at the interface between these structures. As a nonlimiting example, the wedge blank 150 and finish piece 502 may be formed from PMMA, which has an index of refraction of 1.492, and the adhesive may have an index of refraction within +/−0.02 of this value.

The finish piece may have any suitable dimensions when it is applied to the wedge blank. For example, in some embodiments, the finish piece may be initially sized to dimensions on the order of machined surface 406, whereas in other embodiments, the finish piece may be cut to match the dimensions of the machined surface 406 after bonding.

Further, the finish piece may have any suitable thickness. In some embodiments, the finish piece may be substantially a same thickness as wedge blank 150, and may be formed from another wedge blank, as described above. In such a case, face 508 of finish piece 502 proximate to the adhesive may be a machined surface created similarly to that of machined surface 406. Alternatively, the finish piece may comprise a film of material substantially thinner than wedge blank 150. Such a film may be formed in any suitable manner including, but not limited to an extrusion process. In such a case, face 508 of finish piece 502 proximate to the adhesive 504 may be smoother than machined surface 406.

The finish piece may be applied at 212 in any suitable manner. For example, where the finish piece is a thin sheet, the finish piece may be applied via a roller from above or from underneath (e.g. by orienting the machined surface of the wedge blank to face upwardly or downwardly) to push air from the interface between the finish piece and the adhesive. Such techniques may reduce the formation of bubbles and/or reduce existing bubbles within the adhesive layer which may affect optical properties at the interface. In other embodiments, an air bladder may be utilized to apply pressure against the finish piece to remove bubbles. A thin film finish piece also may be applied via a reel-to-reel process.

The adhesive 504 may be cured in any suitable manner, including but not limited to via UV light, heat, electron beam, etc. FIG. 6 illustrates the use of a UV light 600 to cure the adhesive 504.

Referring briefly back to FIG. 2, at 218, method 200 comprises returning the vacuum molding tool to atmospheric pressure and removing the finished optical wedge from the vacuum molding tool (in cases where the optical wedge was not removed from the molding tool prior to lamination).

FIG. 7 shows a cross-section of an example finished optical wedge 700 taken along the same plane as the cross-sections of FIG. 1 and FIGS. 3-6. Finished optical wedge 700 comprises a monolithic wedge-shaped body having a first portion (e.g., wedge blank 150), and a second portion (e.g., finish piece 502) bonded to the first portion via an adhesive 504. The second portion also has an optically-smooth surface 506 on a face opposite of the bottom face (e.g., face 508). The finished optical wedge may have any suitable dimensions. For example, in one embodiment, the wedge thickness may taper from its highest point of 20 mm to 2 mm over a distance of 800 mm, and wedge may have a width of 600 mm. In the embodiment described above, the optical wedge includes an aspherical feature. However, in other embodiments, optical wedge may be configured to have a cross-section that is within a few percent of uniform perpendicular to the axis of taper section.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of fabricating an optical wedge configured to transmit light via total internal reflection between a first light interface located at an end of the optical wedge and a second light interface located at a major face of the optical wedge, the method comprising:
   inserting a wedge blank into a vacuum molding tool;
   applying a vacuum to the vacuum molding tool to impart a surface profile of the vacuum molding tool to the wedge blank;
   removing a layer from a top surface of the wedge blank to expose a machined surface of the wedge blank while applying the vacuum to the vacuum molding tool;
   laminating a finish piece to the machined surface via an adhesive, the finish piece comprising a smoother surface than the machined surface;
   curing the adhesive to form a finished optical wedge; and
   removing the finished optical wedge from the vacuum molding tool.

2. The method of claim 1, wherein the adhesive has an index of refraction within +/−0.02 of an index of refraction of the wedge blank.

3. The method of claim 1, wherein the adhesive is optically transparent.

4. The method of claim 1, wherein laminating the finish piece to the machined surface comprises applying the finish piece via a roller.

5. The method of claim 1, wherein curing the adhesive comprises applying ultraviolet light.

6. The method of claim 1, wherein curing the adhesive comprises applying pressure.

7. The method of claim 1, wherein curing the adhesive comprises applying heat.

8. The method of claim 1, wherein laminating the finish piece to the machined surface comprises printing a hot-melt, curable adhesive onto the machined surface.

9. The method of claim 8, wherein curing the adhesive further comprises applying heat to melt the adhesive.

10. The method of claim 1, wherein the finish piece is thinner than the wedge blank.

11. The method of claim 1, wherein the wedge blank and the finish piece are each formed from PMMA (poly(methyl methacrylate)), and wherein the adhesive is a PMMA adhesive.

12. The method of claim 1, wherein the finish piece is a thin sheet and wherein laminating the finish piece to the machined surface comprises applying the thin sheet with a roller from underneath the machined surface.

13. The method of claim 1, wherein laminating the finish piece to the machined surface comprises applying pressure via an air bladder.

14. A method of fabricating an optical wedge configured to transmit light via total internal reflection between a first light interface located at an end of the optical wedge and a second light interface located at a major face of the optical wedge, the method comprising:

inserting a wedge blank into a vacuum molding tool;

applying a vacuum to the vacuum molding tool to impart a surface profile of the vacuum molding tool to the wedge blank;

while applying the vacuum to the vacuum molding tool, removing a layer from a top surface of the wedge blank to expose a first portion having a machined surface;

laminating a second portion to the machined surface via an optically-transparent hot-melt curable adhesive, the second portion having a surface opposite of a face proximate to the adhesive that is smoother than the machined surface; and curing the adhesive to form a finished optical wedge.

15. The method of claim 14, wherein curing the adhesive comprises illuminating the adhesive with ultraviolet light.

16. The method of claim 14, wherein laminating the second portion to the machined surface comprises removing the wedge blank having the machined surface from the vacuum molding tool before laminating the second portion to the machined surface via the optically-transparent hot-melt curable adhesive.

* * * * *